United States Patent [19]

Herrmann

[11] Patent Number: 4,867,234

[45] Date of Patent: Sep. 19, 1989

[54] HEAT EXCHANGER

[75] Inventor: Hellmut A. Herrmann, Kassel, Fed. Rep. of Germany

[73] Assignee: Schmidt'sche Heissdampf GmbH, Kassel-Bettenhausen, Fed. Rep. of Germany

[21] Appl. No.: 188,315

[22] Filed: Apr. 29, 1988

[30] Foreign Application Priority Data

May 2, 1987 [DE] Fed. Rep. of Germany ....... 3714671

[51] Int. Cl.$^4$ .............................................. F28F 1/00
[52] U.S. Cl. .................................... 115/177; 165/172; 165/154
[58] Field of Search ............... 165/154, 172, 175, 177, 165/179, 185

[56] References Cited

U.S. PATENT DOCUMENTS

| | | | |
|---|---|---|---|
| 2,440,245 | 4/1948 | Chevigny | 165/177 X |
| 3,333,123 | 7/1967 | Baumann | 165/177 |
| 3,513,908 | 5/1970 | Singh | 165/177 X |
| 4,296,738 | 10/1981 | Kelton | 165/177 X |

Primary Examiner—Larry Jones
Attorney, Agent, or Firm—Chilton, Alix & Van Kirk

[57] ABSTRACT

A heat exchanger for cooling a hot process waste gas has an interior gas-flow pipe which is surrounded by a cooling jacket defined by a plurality of parallel pipe segments which are spaced from another and from the gas flow pipe. The pipe segments, through which a coolant flows, are mechanically and thermally interconnected to one another and to the gas flow pipe by means of a body of material having a thermal conductivity which is greater than that of the material from which the pipe segments are fabricated.

6 Claims, 2 Drawing Sheets

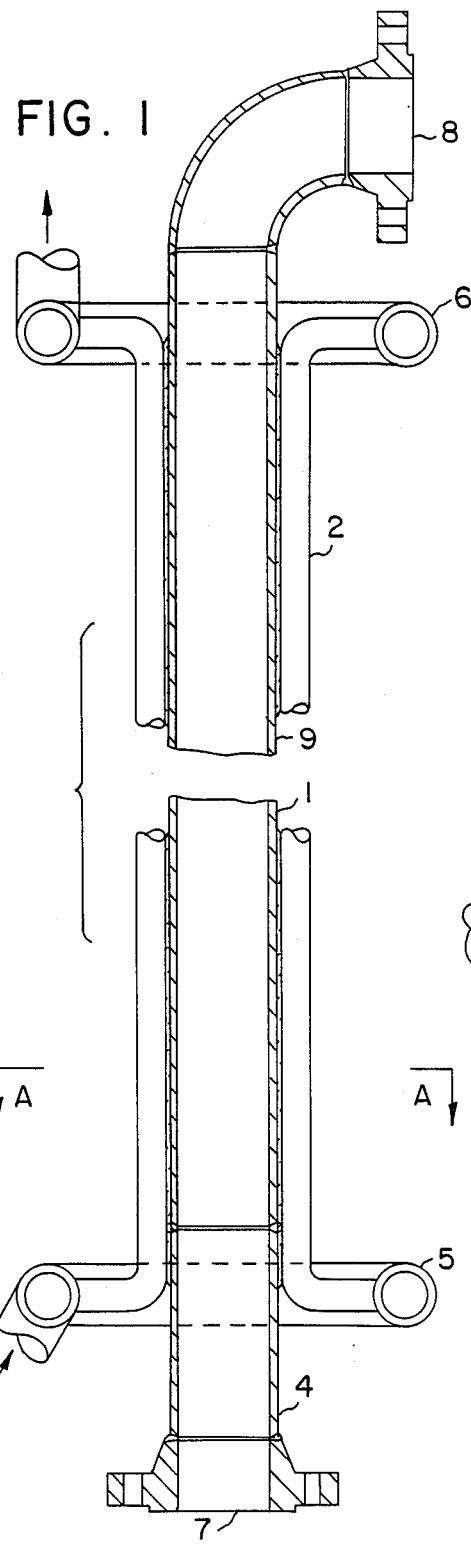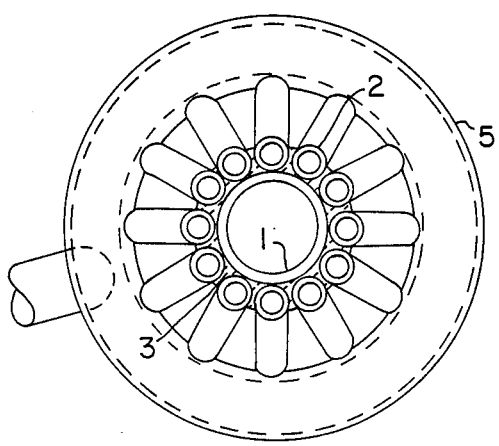

HEAT EXCHANGER

BACKGROUND OF THE INVENTION

1. FIELD OF THE INVENTION

The present invention relates to the cooling of process gases and, particularly, to the transfer of waste heat from a gas to steam generator feed water. More specifically, this invention is directed to improvements in and to heat exchangers and especially to heat exchangers of the type wherein a cooling shield is provided about a generally linear section of a conduit through which a hot gas flows. Accordingly, the general objects of the present invention are to provide novel an improved methods and apparatus of such character.

2. DESCRIPTION OF THE PRIOR ART

Heat exchangers of the type wherein a centrally arranged pipe is surrounded, at least over a significant portion of its length, by a cooling shield or jacket are well known in the art. Such heat exchangers are often used for the cooling of process gases, particularly fission gases resulting from the thermal fission of gaseous and liquid hydrocarbons. These heat exchangers are designed as "one-pipe" devices which connect to respective individual slit tube outlets of the fission oven, the heat exchangers having an internal cross-section which corresponds to that of the fission oven outlet at least at the gas inlet side of the exchanger. For an example of such prior art "one-pipe" heat exchangers, reference may be had to German Patent No. 19 29 479.

Prior art heat exchangers of the "one-pipe" type are typically constructed such that the interior pipe, through which the hot gas flows, is enclosed by a shield pipe. The shield pipe defines an annular chamber through which steam generator feed water, generally under high pressure, will flow. This steam generator feed located between the two pipes thus functions as a cooling medium. The interior pipe which conducts the gas is subjected to the high steam generator pressure from the outside. Since the interior pipe, i.e. the pipe conducting the process gas, must be designed to withstand the high outside steam generating pressure, this pipe must be characterized by a relatively thick wall. Further, given the prevailing heating surface loads in the range of 100-500 kW/m², the wall of the interior pipe is also subjected to high thermal tension and to a high median temperature. This combination of high temperature, high thermal tension and high applied exterior pressure results in potential damage and possible premature failure. Further, because of the mechanical and thermal stresses, it has not been possible to select and utilize the optimum materials, taking into account the process gas conditions and steam generator operation, for both the interior pipe and the shield pipe.

SUMMARY OF THE INVENTION

The present invention overcomes the above briefly described and other deficiencies and disadvantages of the prior art by providing a novel and improved technique for the cooling of a process gas or the like during its passage through a straight pipe section. The present invention also encompasses a unique heat exchanger for implementing this novel method and particularly a heat exchanger wherein the cooling shield about an interior gas flow pipe is defined by a plurality of individual tubes or pipe segments having a relatively small diameter. These individual pipe segments are fluididly interconnected at their opposite ends and, along their length, are oriented generally parallel to the axis of the interior gas flow pipe. The pipe segments which define the cooling shield are also thermally coupled to one another and to the interior gas flow pipe. This thermal coupling, in a preferred embodiment, is accomplished through the use of a joining material having a thermal conductivity which is greater than that of the material from which the shield pipe segments are fabricated. In one reduction to practice, the cooling shield defining pipe segments and the centrally arranged pipe which conducts the hot gas were interconnected in a heat-conducting manner by a castable hard solder.

The above briefly described heat exchanger structure has the advantage that those components which come into contact with water, i.e., the exterior cooling shield defining pipe segments with small diameter, can be fabricated from a material chosen for its ability to withstand the system pressure while the interior gas-conducting pipe can be fabricated from a material that is suitable for process conditions, i.e., a material chosen because of one or more of heat stability, corrosion resistance, and erosion resistance.

As a further advantage of the present invention, the wall thickness of the pipe which conducts the hot process gas discharged from a fission oven needs only to be sufficient to withstand the relatively low fission gas pressure of about 2-5 bar. Thus, the centrally arranged interior pipe may be characterized by a wall thickness which is substantially less than if the pipe were, for example, under an exterior super-pressure up to 150 bar as might be maintained in a steam generator. The reduction in the interior pipe wall thickness, of course, also is advantageous for maximizing heat exchange efficiency. As noted above, the steam generator pipes, i.e., the cooling shield defining pipe segments, which enclose the pipe conducting the process gas are mechanically and thermally connected to the interior pipe by means of a cast solder or other suitable material which will typically have a thermal conductivity which is greater than that of the non-alloy steel typically employed for the steam generator pipes. This manner of interconnection guarantees an intensive and uniform cooling of the thin-walled process gas pipe.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a cross-sectional, side elevation view of a heat exchanger in accordance with a first embodiment of the invention;

FIG. 2 is a cross-sectional view taken along line A—A of FIG. 1;

DESCRIPTION OF THE DISCLOSED EMBODIMENTS

Figure 3:
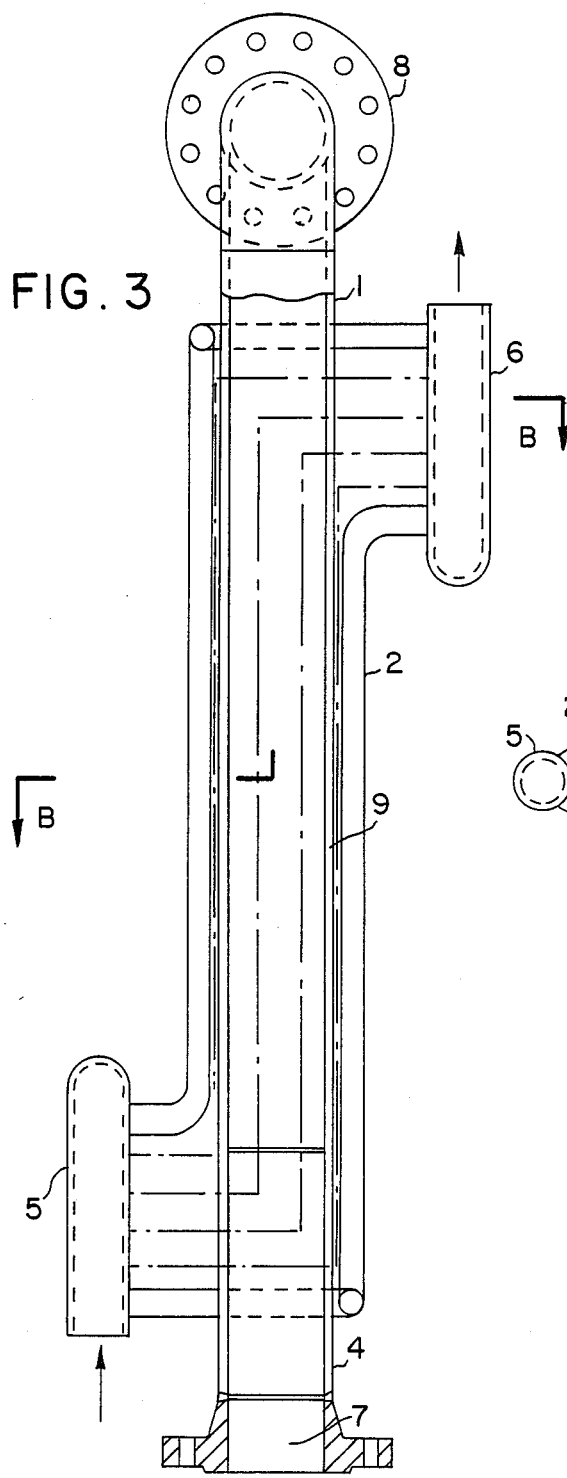
FIG. 3 is a cross-sectional side elevation view of a second embodiment of a heat exchanger in accordance with the invention.

With reference now to the drawings, the gas-conducting pipe of a heat exchanger in accordance with the invention is indicated at 1. Pipe 1 consists of a feed section 4, typically comprised of Cr—Ni or Ni steel, and a cooling section 9, typically comprised of carbon steel. The feed section 4 of pipe 1 is connected to a gas inlet 7 which, in turn, is connected to a waste gas line, not shown. The upper or discharge end of pipe 1 is connected by means of a flange 8 to downstream apparatus which typically further treats the cooled waste gas exiting from the heat exchanger. The shield is defined by a plurality of relatively small diameter pipes 2 which, along a major portion of their length, have their axes oriented parallelly with respect to the axis of the cooling section 9 of gas-conducting pipe 1. The cooling shield defining pipes 2 are mechanically connected to each other and to the gas-conducting pipe 1 in a heat-conducting manner by means of hard solder 3. All of the individual shield defining pipes 2 are fludically interconnected at their lower ends by means of a collector 5. The pipes 2 are also interconnected, at their upper ends, by a common collector 6. The shield pipes 2 thus may comprise part of a steam generator system wherein water is delivered to collector 5 and water or steam exits the heat exchanger via collector 6.

Figure 4:
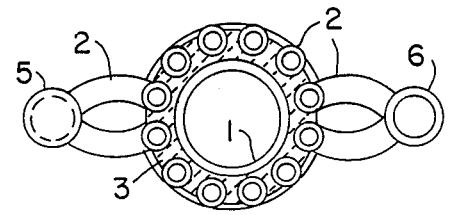
FIG. 4 is a cross-sectional view taken along line B—B of FIG. 3.

The differences between the embodiment of FIGS. 1 and 2 and the embodiment of FIGS. 3 and 4 resides primarily in the arrangement of the collectors 5 and 6.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A heat exchanger comprising:
   a centrally arranged gas-conducting pipe, said gas-conducting pipe having a wall which defines a gas conduction passage, at least a portion of said gas-conducting pipe extending linearly and having an axis;
   a cooling shield surrounding said gas-conducting pipe along more than 50% of the length of the linear portion thereof, said cooling shield having:
      a plurality of individual pipe segments, said pipe segments each having a wall which defines a fluid flow passage, said pipe segments being spacially displaced from one another and from the wall of said gas-conducting pipe, said pipe segments being straight and each having an axis, the axis of said pipe segments being generally parallel to the axis of said gas-conducting pipe; and
      means for establishing a predetermined heat exchange relationship between said pipe segments and said gas-conducting pipe, said heat exchange relationship establishing means connecting the outside of said walls of said pipe segments to one another and to the outside of said wall of said gas-conducting pipe, said heat exchange relationship establishing means having a thermal conductivity which is greater than that of the material comprising said walls of said pipe segments;
   means for delivering a coolant to first ends of said pipe segments from a common source; and
   collector means for receiving the coolant from the second ends of said pipe segments.

2. The apparatus of claim 1 wherein said heat exchange relationship establishing means is comprised of a castable metal.

3. The apparatus of claim 2 wherein said gas-conducting pipe is embedded in said castable metal along the length of said pipe segments.

4. The apparatus of claim 3 wherein said pipe segments are in intimate contact with said castable metal over more than 50% of their circumferences.

5. The apparatus of claim 2 wherein said castable metal is a solder.

6. The apparatus of claim 4 wherein said castable metal is a solder.

* * * * *